United States Patent
Cromwell et al.

(10) Patent No.: US 8,910,036 B1
(45) Date of Patent: Dec. 9, 2014

(54) WEB BASED COPY PROTECTION

(75) Inventors: Robert Cromwell, San Francisco, CA (US); Andrew C. Hoyer, San Francisco, CA (US); Ryan P. Teuscher, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 0 days.

(21) Appl. No.: 13/351,134

(22) Filed: Jan. 16, 2012

Related U.S. Application Data

(60) Provisional application No. 61/449,156, filed on Mar. 4, 2011.

(51) Int. Cl.
*G06F 17/00* (2006.01)

(52) U.S. Cl.
USPC .......................................... 715/234; 715/249

(58) Field of Classification Search
CPC ....................................................... G06F 21/10
USPC ......................................... 715/200, 249, 234
See application file for complete search history.

(56) References Cited

U.S. PATENT DOCUMENTS

| | | | |
|---|---|---|---|
| 6,922,693 B1 * | 7/2005 | Rubin et al. ........................... | 1/1 |
| 7,155,744 B2 * | 12/2006 | Schreiber et al. ............... | 726/26 |
| 7,657,759 B2 * | 2/2010 | Rubin et al. ................... | 713/193 |
| 8,052,525 B2 * | 11/2011 | Yang ............................... | 463/29 |
| 8,615,810 B2 * | 12/2013 | Kim et al. ....................... | 726/33 |
| 2004/0100509 A1 * | 5/2004 | Sommerer et al. ............ | 345/864 |

\* cited by examiner

*Primary Examiner* — Manglesh M Patel
(74) *Attorney, Agent, or Firm* — Ascenda Law Group, PC

(57) ABSTRACT

In a method and a system for an Internet copy protection method, a source document markup file is partitioned into a plurality of subsets of text, one or more graphical representations of at least some of the plurality of subsets are created and those subsets of text in the source document are processed to create a transformed document, location information is also generated, which identifies a position in the transformed documents that is equivalent to the position of the textual content which corresponds to the graphical representation in the source document. The transformed document, graphical representations, and location information may then be transmitted over a network to a client device.

18 Claims, 13 Drawing Sheets

WEB BASED COPY PROTECTION

CLAIM OF PRIORITY

This patent application claims the benefit of priority, under 35 U.S.C. Section 119(e), to U.S. Provisional Patent Application Ser. No. 61/449,159, entitled "Web Based Copy Protection," filed on Mar. 4, 2011, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc. All Rights Reserved.

BACKGROUND

Content delivered to World Wide Web ("web") browsers in the form of a markup language such as Hypertext Markup Language (HTML) is generally easy for users to copy. Most web browsers allow users to highlight sections of text and then utilize an operating system's "copy" clipboard function to copy the selected text. This presents challenges for content providers wishing to protect their content on the web.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
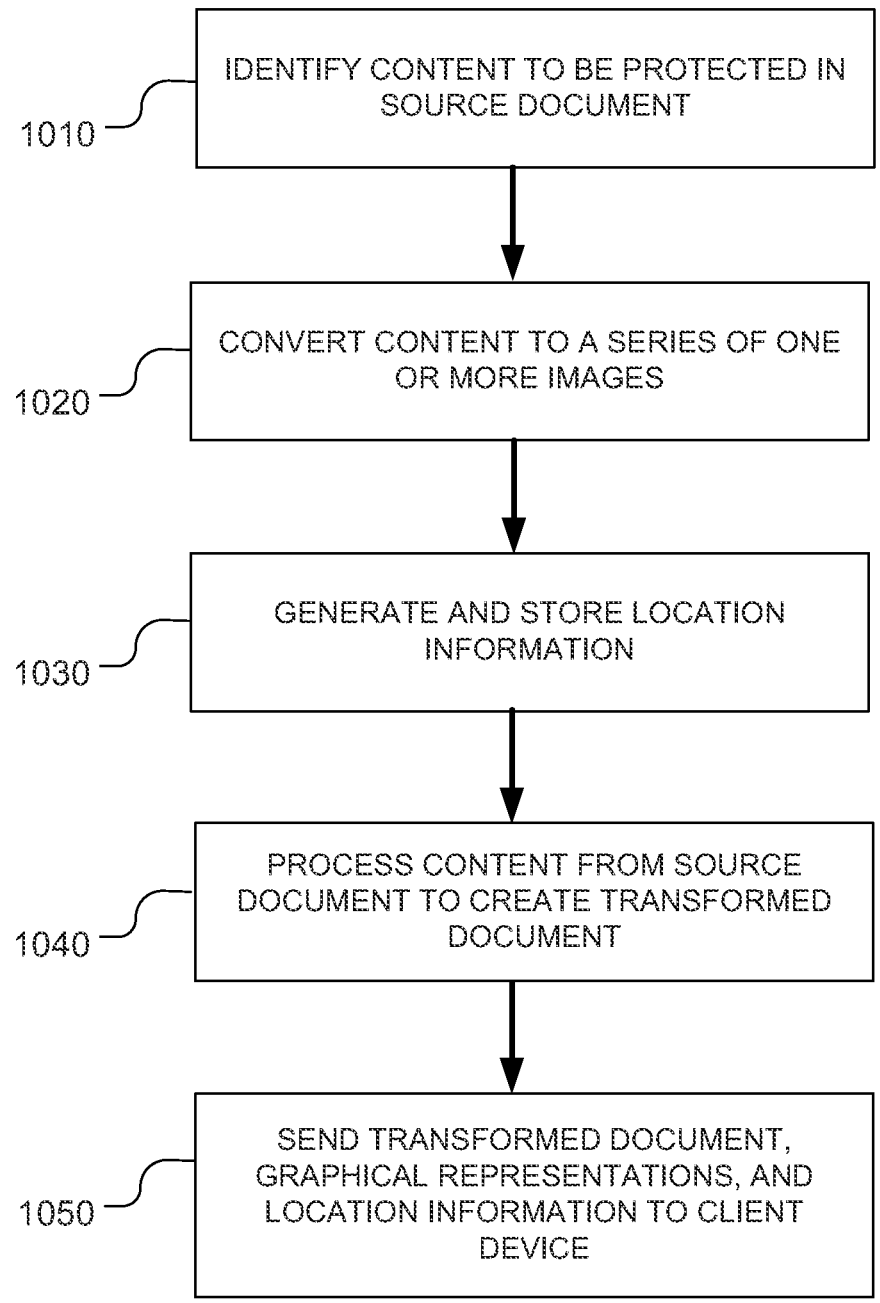
FIG. 1 is an example flowchart of a method of content protection, according to some embodiments of the present disclosure.

One solution for content protection includes rendering a page of content on a server and then doing a full screen image capture. The resulting image is then sent to a user's web browser where the page is displayed as a static image. While this solution prevents copying, there are drawbacks. For example, individual portions of the text cannot be selected by the browser's native selection tools, for example, for highlighting and copying, or the like. Additionally, since the entire page is a single image, the page layout processes (e.g. text "flow"—the ability of a browser to reposition individual characters, words, or other portions of text to fit the dimensions of the browser window) employed by browsers to display the content correctly for various screen sizes and layouts may be impaired or unusable. Another drawback is that the font size cannot be altered without scaling the entire image (and thus the entire page).

Another solution utilizes a script to disable the various clipboard functions. While this may control clipboard functionality, the protected content is still sent as plain text in the actual HTML file itself and users may circumvent this copy protection solution by using the "view source" function commonly available on web browsers to view the plain text content contained in the source HTML file.

Yet other solutions involve using a Java, Flash, or other program running within the browser to display the content. These solutions may implement their own text selection mechanisms and do not require browser plugins. These solutions may impair usability or be inefficient to implement.

Disclosed are systems, methods, and machine readable media for protecting textual content in a document delivered to a client application from unauthorized use by a content user. This solution may allow for correct page layout (e.g. text flow) and may also provide a mechanism by which content providers control user access to the content. This solution may also allow for the reuse of the browser's native text selection capabilities to provide for desirable interactions with the electronic content such as highlighting, adding notes to a particular selection of text, and providing controlled access to the content. In some examples, this may be done by replacing each word of textual content in a document with an image of the word. The content user's browser then renders the content as a series of images as opposed to text. This prevents the actual text of the content from being sent to the client, while still enabling it to be displayed and selected using native text selection capabilities of the client browser. The browser may utilize its existing layout techniques to ensure the best user experience. Additionally, a script may also be sent to the client browser which controls the clipboard functionality to prevent copying, saving, or other undesired access to the images.

In some examples, one or more graphical representations of the textual content contained in a source document are created, and then the textual content in the source document is removed or otherwise processed in order to create a transformed document. The graphical representations, the transformed document, and information regarding the proper locations to place the one or more graphical representations in the transformed document are then sent to the client application. The client application may then display the transformed document and the one or more graphical representations to a content user by utilizing the location information to properly display the graphical representations in the transformed document. In some examples, a script executing on a client application may then disable certain browser features that would allow copying, pasting, printing, or otherwise using content. In yet other examples, the script may allow for much more limited access to the content.

In some examples, the source document may contain content (or contain links to content) and instructions on how to render the content (e.g., font, size, layout, and the like) as well as instructions to execute one or more programs (e.g., scripts). The content may include textual content, image content, audio content, audiovisual content or the like. In some examples, the source document may be a markup language document, such as a HyperText Markup Language document (HTML), eXtensible Markup Language (XML), or other markup format.

The textual content in the source document may be partitioned into one or more subsets with any desired degree of granularity for conversion into a series of one or more graphical representations. Thus, for example, each letter, word, sentence, paragraph, or the like, may be converted into its own graphical representation. In some examples, the graphical representations may be a series of one or more instructions for drawing the textual content (e.g., drawing instructions or commands), image data such as a spatially mapped array of pixels (e.g., a bitmap or pixmap), or vector graphics data. The graphical representation of the textual content, when drawn, renders an image or images of the textual content.

To generate the graphical representations, in some examples, a font module, or script may be utilized. The font module or script may be implemented as a JavaScript module that describes the desired font of the textual content. The font module or script in some examples may be and/or include a font definition file such as a TRUETYPE® font file. The font module or script may take a raw string as input and may output a styled representation of the string (according to the font) in a bitmap, a series of drawing instructions, or vector graphics data. The font module or script may iterate over the textual content and look up each character of the textual content in a map. The map associates characters with the styled bitmap representations of characters, the appropriate drawing instructions to render the styled characters, or the vector graphics data representing the styled characters. There may be many of these maps to represent different fonts as well as different versions of the same font. These character graphical representations may be concatenated into one or more graphical representations to produce a single, combined graphical representation. In addition, the font module or script may also support attributed string inputs that contain basic markup that may inform the font script of which version of the font to use. Basic markup may include bold, italic, underline, and other tags. For example, if "<b>This</b> is bold" was input into the font module or script, the module or script would create a bold version of the graphical representation around the string "This" and an unbolded graphical representation for the rest of the string. The graphical representations may be stored in separate files sent to the client device or may be included in the transformed document using a data URI scheme which allows markup pages to include data in-line as if they were external resources.

The information regarding the proper location of the graphical representations may be used by the client browser to insert the graphical representations into the transformed document to reconstruct the source document. The location information may specify a position within the transformed document where the graphical representation may be rendered, a position relative to the position of other graphical representations, or absolute screen coordinates or other data which inform the location of the graphical representation. For example, the location information may instruct the client browser to render a particular graphical representation within a particular pair of tags within the transformed document (e.g., within a particular pair of canvas tags). This location may correspond to the location in the source document from which the text that corresponds to the graphical representation was removed to create the transformed document, such that the source document is reconstructed with the exception that while the textual content is displayed, it is displayed as an image and not as text.

In some examples, the location information may include one or more pairs of markup tags in the transformed document and correlation information which correlates the one or more pairs of markup tags with one or more graphical representations. The correlation information may specify the graphical representations which are to be placed within a pair of markup tags and the markup tags may specify the positioning of the graphical representations within the document. The correlation information may be stored as metadata or other information with the markup tags themselves (e.g. a pointer to an image within an <img> tag.) In yet other examples, the correlation information may include a naming convention for the one or more graphical representations. For example, each of the graphical representations may be labeled in the order in which they are to be placed in the tags (e.g. file1.jpg may be placed in the first tag, and the like). In other examples, correlation information may not be necessary. For example, the proper graphical representation may be included as inline data according to a data URI scheme. In other examples, the correlation information may include a list or some other data structure, for example, a list of tags and the graphical representations that belong in that tag. In these examples, the location information may be included in the transformed document, or may be included in an execution module or script (e.g., JavaScript, CSS file, or the like) which may be sent to the client along with the document, which may include the location information or part of the location information. When the execution module or script is executed (in some examples, as the transformed document is rendered by the client), the execution module or script may insert the one or more graphical images into the proper locations based upon the location information. In some examples, where multiple graphical representations are to be placed within one pair of tags, the correlation information may also specify an ordering of the one or more graphical representations within the tag.

While the resultant textual content as rendered by a web browser is readable by the user, a permissions module or script executing on the client application of the content user may disable the browser's copy, paste, print or other content access functionalities. Because the textual content may be described as a series of graphical representations, and in some examples, the unprotected text is not included in what is sent to the client application, utilizing the browser's view source functionality (or intercepting the transformed document) may not give a content user unprotected access to the content. Thus, the content is protected from unauthorized use. Additionally, because each word (or other textual unit such as sentence, paragraph, or the like) may be separately described by an image, the browser's layout functionality may be preserved because the browser may position the individual images in the correct locations and apply regular styling, such as Cascading Style Sheets (CSS). Selection is also possible, and the permissions module or script running on the user's browser may detect a user's selection and contact an authorization service to request permission to have the content sent unprotected. This may allow the content user controlled access to the content. This access may include access allowing printing, copying, pasting, highlighting, and/or adding notes to portions of text.

Turning now to FIG. 1, a general example method of copy protection is shown. At operation 1010, the textual content which is to be protected is identified and, in some examples, marked within the source document. In some examples, all textual content may be protected, but in yet other examples, only certain specified content may be protected. The identified textual content may be marked to indicate that it is to be protected. In some examples, this may be done using one or more markup tags. In other examples, this may be done by a pattern (e.g. XPath XML Path Language from the World Wide Web Consortium or CSS selectors). Identification of content to be protected may be used by later operations in order to determine which portions of text to protect.

At operation 1020, the text which is to be protected (which was identified and/or marked at operation 1010) may be partitioned into a series of one or more subsets of contiguous text, wherein one or more graphical representations are generated for each subset. The subsets may be individual textual characters, words, sentences, paragraphs, or the like. As the conversion of the textual content into the series of one or more graphical representations proceeds, the location information is generated and stored at operation 1030. At operation 1040, the protected text is processed to create the transformed document. The processing done to create the transformed document is such that the processed text (after processing) would not be normally rendered by standard rendering engines as textual content within the rendered transformed document. For example, the processing may include removing the text, but in other examples, may include moving or delineating the protected text. For example, the protected text may be moved to an alt attribute (alternative attribute) of one or more tags in the document. Alt attributes are not normally rendered within the rendered document by standard rendering engines, but may be rendered by certain rendering engines as an alternative to displaying images for accessibility or other reasons (e.g. screen readers for the blind or browsers incapable of rendering images). For the purposes of this application, text within an alt attribute is not considered to be normally rendered. Similarly, other tags or tag properties/attributes that may be used to present alternative renderings (e.g., hidden or non-standard tags/properties) are not considered to be normally rendered. As used herein text rendering is the receipt of a textual code (e.g., ASCII or Unicode) that is then presented to a process for typeset and display as a character on a display. This is in contrast to rendering graphical representations which, when rendered, may show an image that may be perceived by an end user as a textual character or character(s), but is described in terms of vectors, pixels, colors, or the like rather than a textual code. In some examples, text that is not normally rendered is text that is not rendered by the client application within the rendered transformed document unless specific user action is taken to render that text (e.g., changing a setting to render the text, hovering over an image, and the like). At operation 1050, the transformed document, graphical representations, and location information is then sent to a client application.

Figure 2:
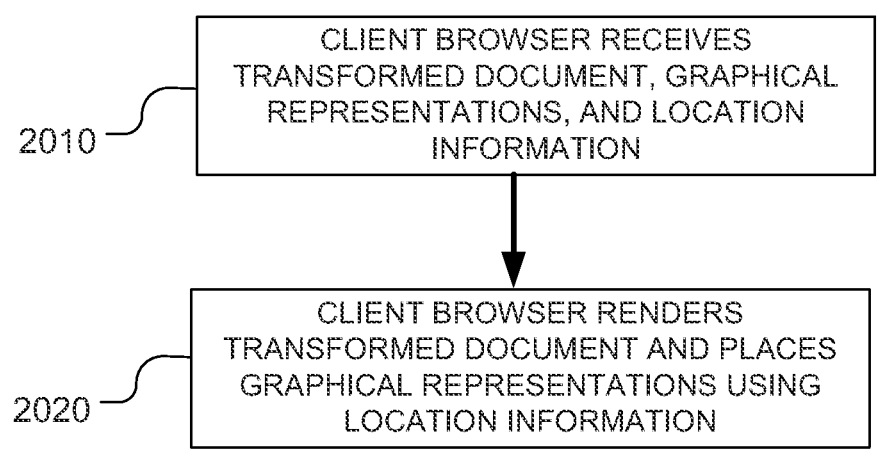
FIG. 2 is an example flowchart of a method of rendering the protected content, according to some embodiments of the present disclosure.

FIG. 2 shows an example of a method used by the client application to render the protected content in a transformed document. At operation 2010 the client application receives the transformed document, graphical representations, and location information. At operation 2020, the client application uses the location information to render the graphical representations in the proper position within the document to a content user.

Figure 3:
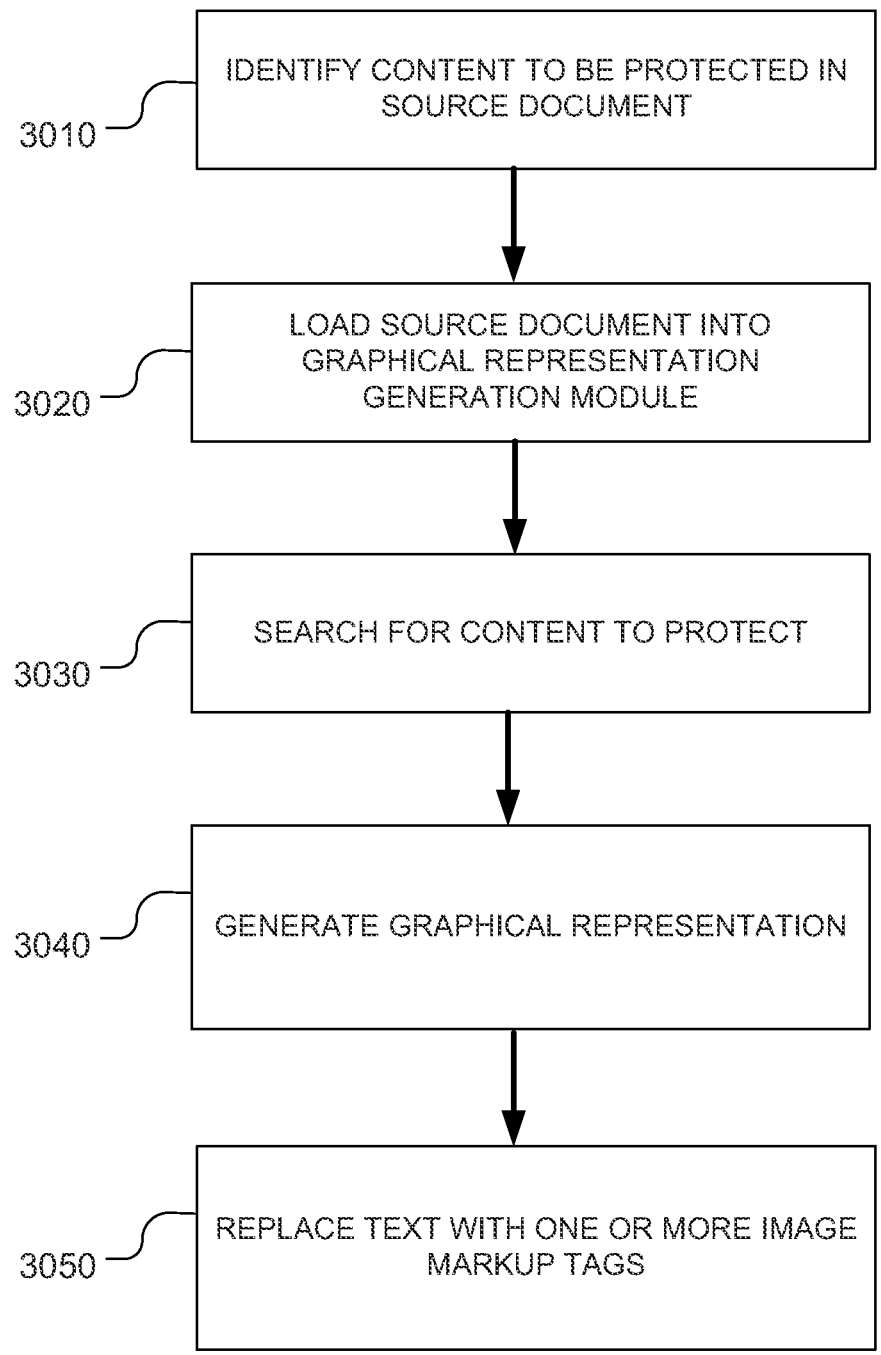
FIG. 3 is an example flowchart of a method of content protection, according to some embodiments of the present disclosure.

Turning now to FIG. 3, another example method is shown in which the textual content is converted to a series of one or more graphical representations using a computer program or script which converts text into graphical representations. At operation 3010 the textual content which is to be protected is identified and marked as was discussed with respect to FIG. 1 at operation 1010. At operation 3020, the source document is loaded into the graphical representation generation module or script. At operation 3030, the source document is searched for the identified and/or marked content to protect. At operation 3040, upon finding a portion of textual content to protect, the conversion module generates one or more graphical representations of the textual content. In some examples, the graphical representation may be the actual bitmap, pixmap, vector graphics or other low-level image data of the actual portion of textual content. In these examples, the graphical representation generation script or module may replace the textual content at operation 3050 with an image markup tag in the source document (or, in some examples where the graphical representation is vector graphics data, object or iframe tags for compatibility with certain browsers) including instructions in the image tag on the proper image to display at that location. In this example, the location information may be the combination of the link in the image tag itself and the location of the image tag in the document.

The client application may receive the transformed document and the graphical representations and may render it. The rendering engine of the client application (e.g. a browser or the like) utilizes the location information in the image tags in order to properly render the graphical representations of the textual content in the corresponding locations of the transformed document.

Figure 4:
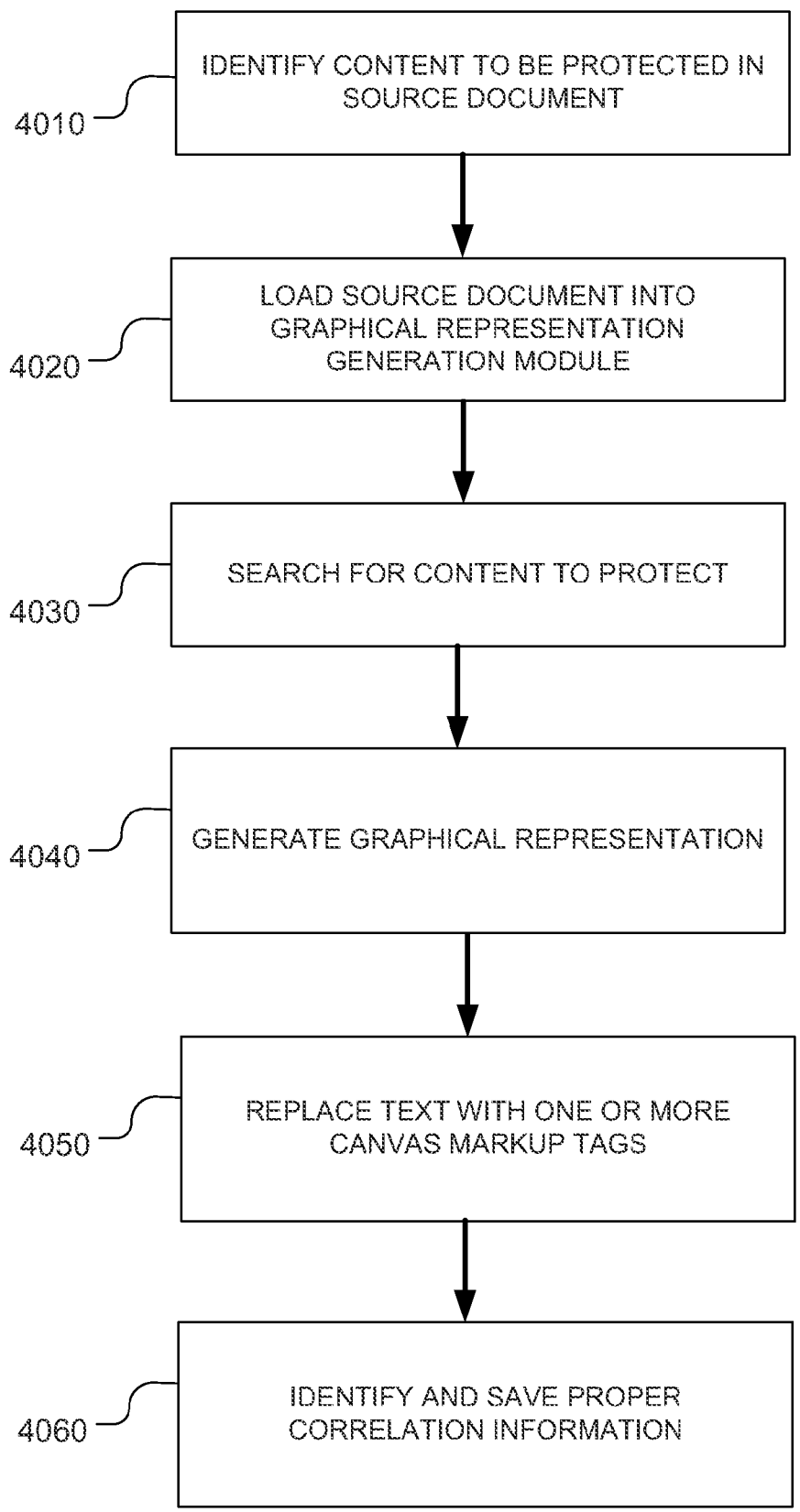
FIG. 4 is an example flowchart of a method of content protection, according to some embodiments of the present disclosure.

Turning now to FIG. 4, another example method is shown. In this example, the textual content may be converted into one or more drawing instructions which cause the client application's rendering engine to display the proper graphical representation of the textual content at the proper locations.

At operation 4010, the textual content which is to be protected is identified and/or marked as previously described. At operation 4020, the source document is loaded into the graphical representation generation application, module, or script. At operation 4030, the source document is searched for the textual content to be protected, which was identified and/or marked at operation 4010. At operation 4040, upon finding a portion of textual content to be protected, the conversion module generates the graphical representation of the textual content. In this example, the graphical representation may be a series of one or more drawing instructions for drawing a graphical image of the textual content. In examples where the graphical representations are a series of one or more drawing instructions, the conversion module may replace the textual content at operation 4050 with one or more canvas markup tags that serve as part of the location information which may be used to properly place the graphical representations in the transformed document by the client application.

The HTML5 canvas element allows for dynamic and scriptable rendering of shapes and bitmap images. The canvas is a drawable region defined by markup code that is accessible by scripts executing in the browser or rendering engine. In some examples, such scripts include JavaScript. These scripts may utilize certain drawing functions to draw to the canvas area. When the renderer encounters a canvas tag, the text inside the tags is not rendered; rather, the browser creates a blank canvas that may be later written to by a script.

At operation 4060, the graphical representation generation module or script may then record the proper correlation information for each graphical representation as it is generated. For example, the graphical representation generation module or script may associate a particular canvas tag with a particular graphical representation. This correlation information may be embedded in the canvas tag, as part of an execution module or script which may be created by the system, or may be saved as part of another file which may also be sent to the client application.

Figure 5:
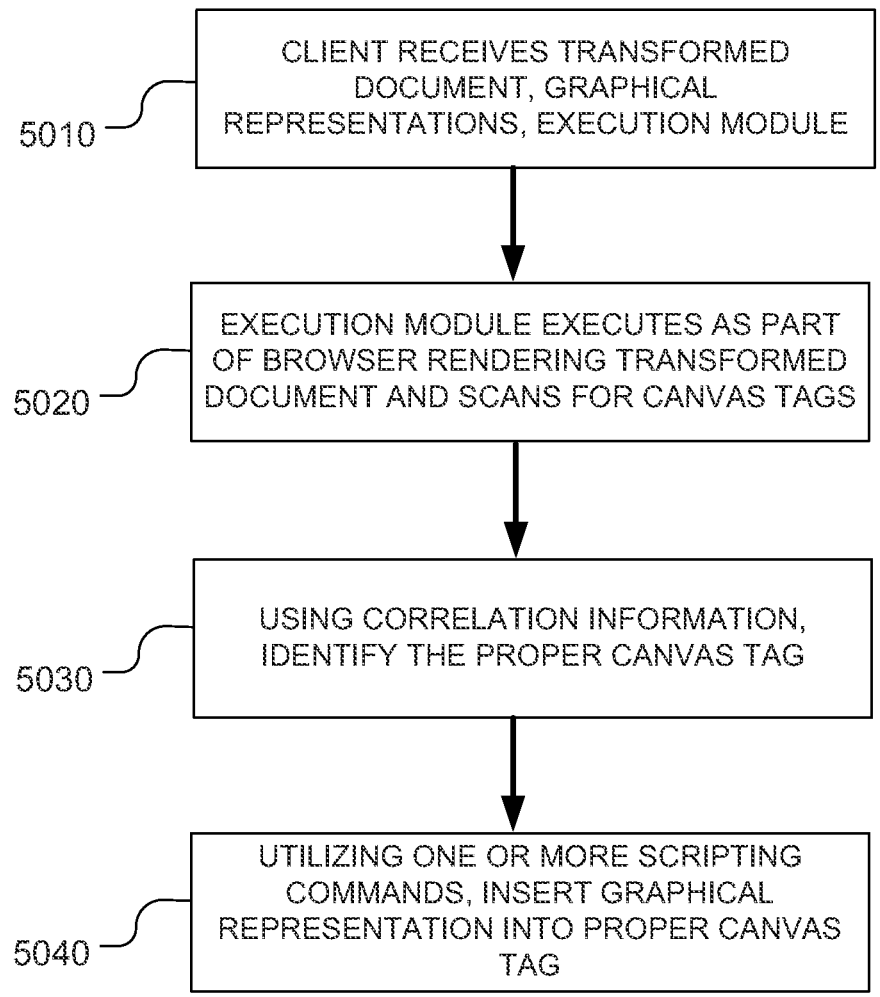
FIG. 5 is an example flowchart of a method of rendering protected content, according to some embodiments of the present disclosure.

Turning now to FIG. 5, another example method of rendering protected content is shown. The client application receives the transformed document, the graphical representations, and an execution module or script at operation 5010. In some examples, the execution module or script executes as the client application is rendering the transformed document (but could run anytime before or after rendering) and scans the transformed document at operation 5020 for a pair of canvas tags. While FIG. 5 shows the execution module or script being sent to the client, the execution module or script may be part of the client application itself. Once a pair of canvas tags is found, the execution module or script utilizes the correlation information to identify the proper graphical representation or representations for those canvas tags at operation 5030. By utilizing one or more of the scripting commands, the execution module or script may insert the graphical representations into the canvas tags at operation 5040 and cause the client application to properly render the graphical images in the proper locations. The execution module or script may be created specifically for each source document (in which case the location information may be included in the execution module or script) or may be generic for one or more source documents (in which case the location information may be inserted into the transformed document or sent as a separate file).

While the above example utilizes graphical representations in the form of drawing instructions inserted into a canvas tag, the graphical representations could also be low-level image data such as bitmap data or vector graphics data inserted into the canvas tags in the same way by the execution module or script.

Figure 6A:
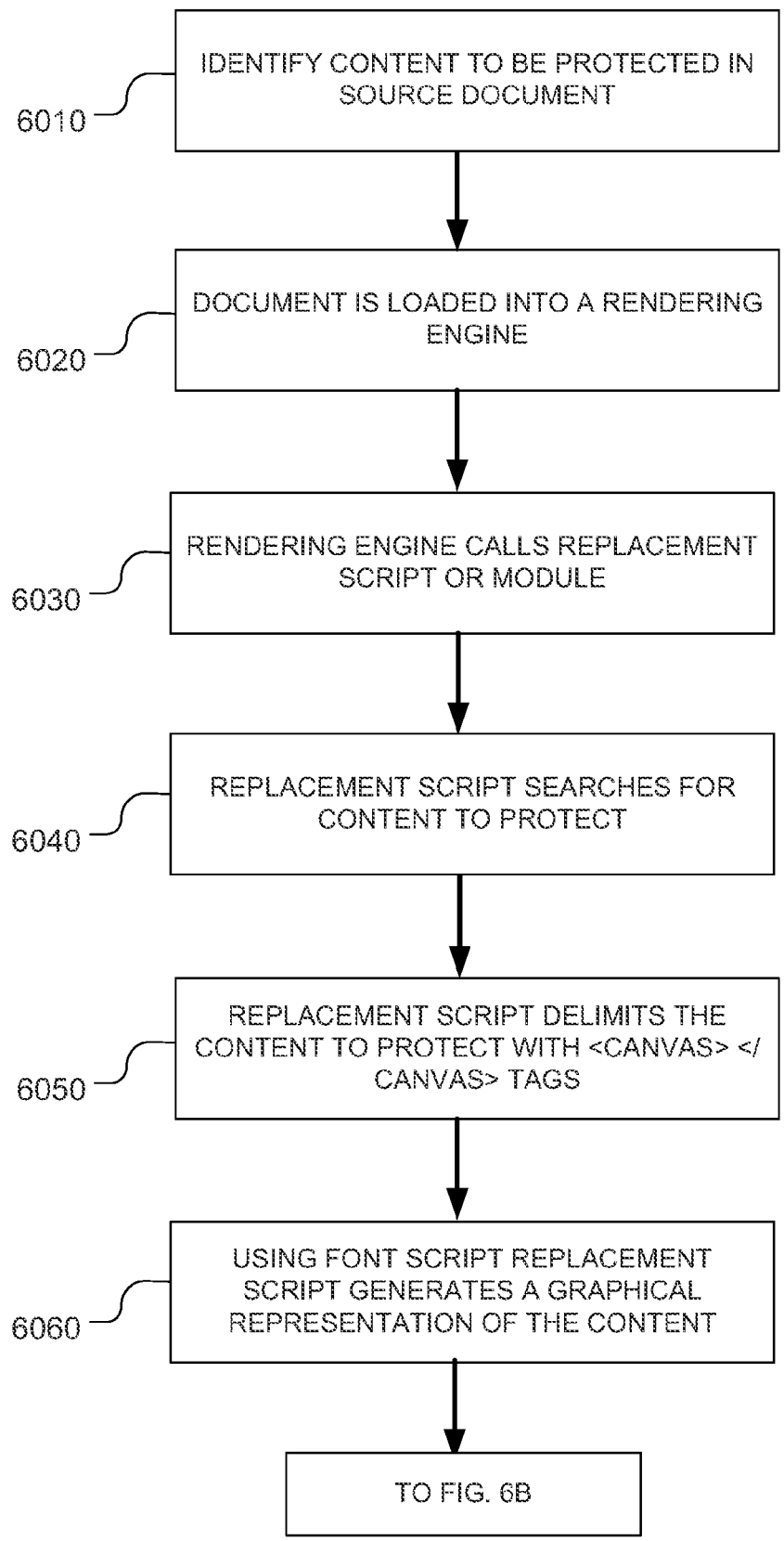
FIG. 6A is an example flowchart of a method of content protection, according to some embodiments of the present disclosure.

In previous examples, a dedicated program was used to convert the textual content to graphical representations. In yet other examples, one or more scripts or programs executing in a rendering engine may be used. An example is shown in FIG. 6A. The rendering engine renders the document based on the instructions in the document (e.g., the markup) and in some cases formatting information (such as Cascading Style Sheets (CSS), Extensible Style sheet Language (XSL), and the like). Rendering is the process of taking the marked up content and formatting information and displaying the formatted content on a screen or to a location in memory. An example rendering engine includes a typical rendering engine that is part of an Internet browser. Example browsers include MICROSOFT INTERNET EXPLORER® developed by Microsoft, Corp., of Redmond, Wash., SAFARI® developed by Apple, Inc. of Cupertino, Calif., CHROME® developed by Google Inc. of Mountain View, Calif., or the like. SAFARI and CHROME utilize the open source WEBKIT® rendering and layout engine. In some examples, the output of the rendering process may be displayed on a display, but in other examples, the output of the rendering process may be stored in memory. The rendering engine may execute one or more scripts included in the document.

At operation 6010, the textual content which is to be protected is identified as described previously. At 6020, the document is loaded into the rendering engine. As the rendering engine renders the content according to the instructions in the document (e.g., the markup tags and other instructions), the document instructs the rendering engine to load and execute the replacement module or script at operation 6030. In some examples, the replacement module or script is implemented using a JavaScript script which has instructions to parse the document for the previously identified and/or marked textual content to protect at operation 6040. Once it finds the textual content, at operation 6050, it may delimit the textual content, or a portion of the textual content with HTML5 canvas tags to create a drawable canvas.

Figure 6B:
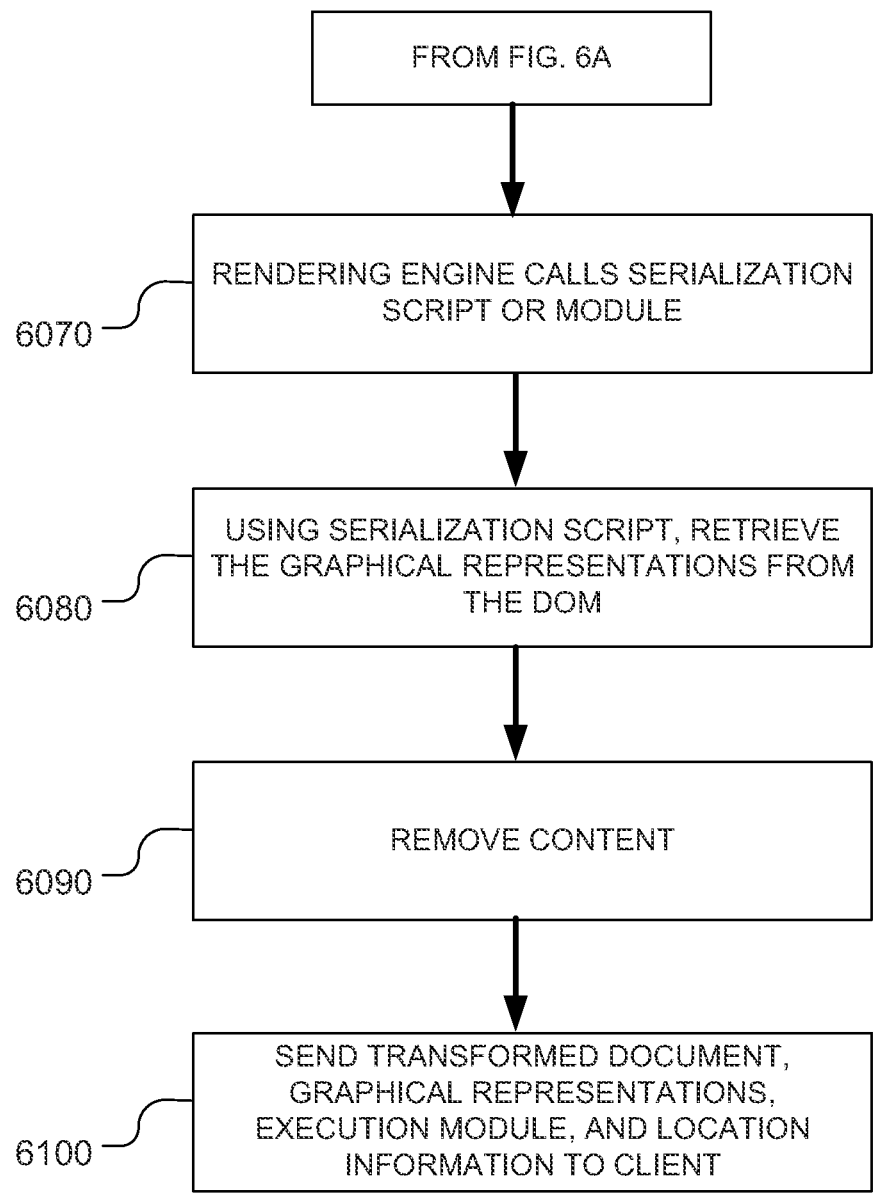
FIG. 6B is an example flowchart of a method of content protection, according to some embodiments of the present disclosure.

The replacement module or script may then access the inserted canvases using a document object model (DOM) generated by the renderer. A DOM is a cross-platform and language independent convention for representing and interacting with objects in an HTML, XHTML, and XML document. The DOM allows JavaScript and other programs executing within the browser to access, read, and interact with the HTML, XHTML, and XML source elements (including the canvas created by the canvas tags). The replacement module or script may then generate the graphical representations using a font module or script and insert them into the canvas at operation 6060. Once the graphical representations are inserted into the canvas, they are rendered by the rendering engine. Turning now to FIG. 6B, at operation 6070, the rendering engine may call a serialization module or script. The serialization module or script may retrieve the graphical representations from the canvases using the DOM at operation 6080, and the serialization module or script may also save the proper correlation information of the one or more graphical representations. In some examples, serialized image data (the graphical representations) can be written to another file (which may be sent to the client device) or may be written back to the source document in place of the textual content. The textual content is then removed at operation 6090 from the source document to create the transformed document by either the serialization module or script or some other script. The transformed document, the series of one or more graphical representations, the location information, and the execution module or script are sent to the client application at operation 6100. The client application receives the transformed document, the series of one or more graphical representations, the execution module or script, and the location information and renders the document as previously described. While separate font, replacement, and serialization modules or scripts were described above, it will be appreciated by one skilled in the art with the benefit of Applicants' disclosure that the functions performed by those scripts may be incorporated into any number of distinct scripts. Thus, for example, the functions of the replacement, font, and serialization modules or scripts may be performed by a single script, two scripts, three scripts, four scripts and so on.

Figure 7A:
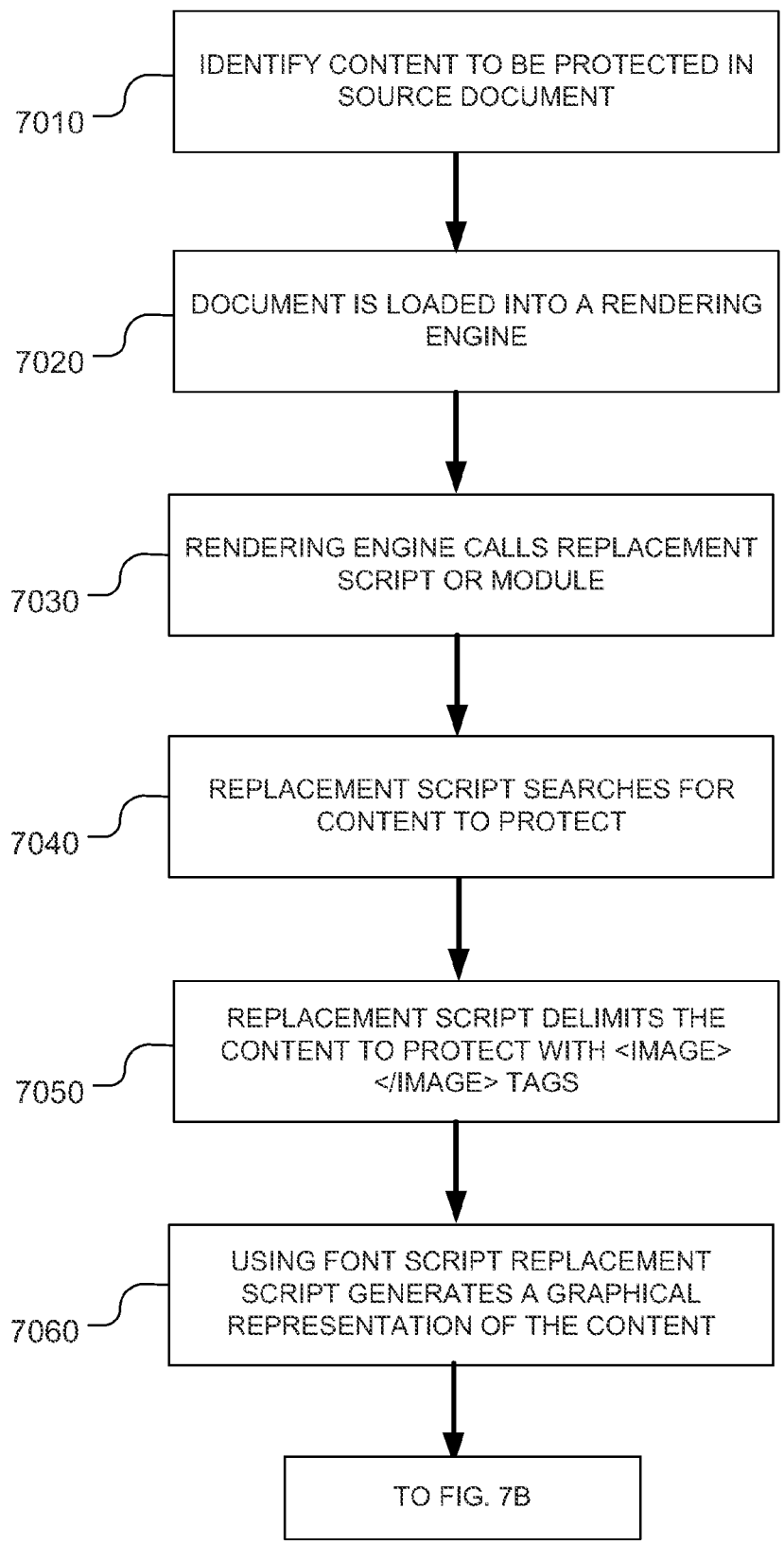
FIG. 7A is an example flowchart of a method of content protection, according to some embodiments of the present disclosure.

Turning now to FIG. 7A an example flowchart of a method of content protection is shown. The rendering engine may render the document based on the instructions in the document (e.g., the markup) and, in some cases, formatting information (such as CSS, XSL, and the like). As in FIGS. 6A and 6B, the rendering engine may execute one or more scripts included in the document. At operation 7010, the textual content which is to be protected is identified and/or marked as previously described. At operation 7020, the document is loaded into the rendering engine. As the rendering engine renders the content according to the instructions in the document (e.g., the markup tags and other instructions), the document instructs the rendering engine to load and execute the replacement module or script at operation 7030. The replacement module or script, in some examples, is implemented using a JavaScript script which has instructions to parse the document for textual content to protect at operation 7040. At operation 7050, once it finds the textual content, it may delimit the textual content (or a portion of the textual content) with image tags.

Figure 7B:
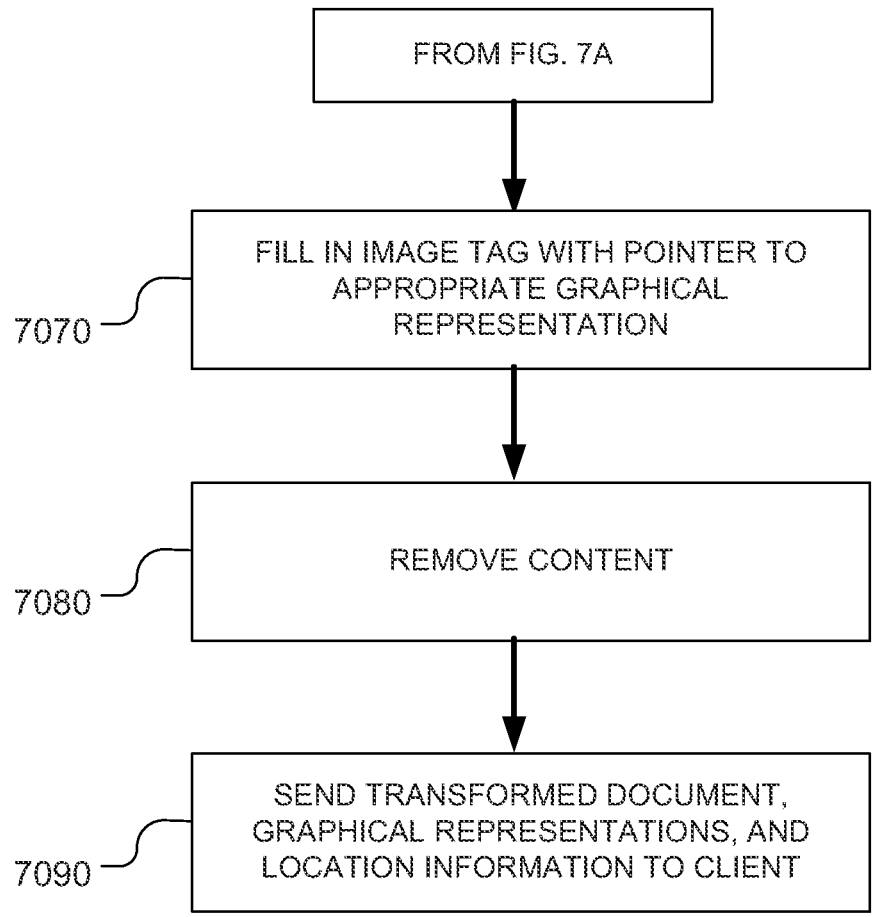
FIG. 7B is an example flowchart of a method of content protection, according to some embodiments of the present disclosure.

The replacement module or script may then generate the graphical representations using a font module or script at operation 7060. Turning now to FIG. 7B, at operation 7070, the replacement module or script may then fill in the image tag with a pointer to the generated one or more graphical representations. The content is then stripped at operation 7080 from the source document to create the transformed document by either the serialization module or script or some other module or script. The transformed document, the series of one or more graphical representations, and the location information (e.g., the information in the image tags) are sent to the client at operation 7090. The client application receives the transformed document, the series of one or more graphical representations, and the location information and renders the document as previously described. In this example, the location information is part of the image tag in the transformed document. While separate font and replacement modules or scripts were described above, it will be appreciated by one skilled in the art with the benefit of Applicants' disclosure that the functions performed by those modules or scripts may be incorporated into any number of different modules or scripts. Thus, for example, the functions of the replacement and font modules or scripts may be performed by a single script (or module), two scripts (or modules), three scripts (or modules), four scripts (or modules) and so on.

The resultant rendered content is similar in appearance to a normal text-based HTML version of the same page. This is because the browser may utilize its layout tools in order to arrange the various image data just as it would a word, sentence or other unit of textual content. Additionally, users may select (using the native selection controls of the web browser) the various words and sentences. Content creators may control the smallest selection unit based on how the protected content was partitioned. If each graphical representation represents a single word, then the smallest portion that may be selected may be a word (and not portions of words); however, if each graphical representation represents a complete sentence, then complete sentences may be selected (and not portions of those sentences). This may allow content creators to fine tune the level of copy protection desired. While users may select portions of the displayed images as if they were text, the execution module or script may prevent them from utilizing the clipboard functionality.

While the previous example utilized canvas tags and image tags, one skilled in the art with the benefit of Applicants' disclosure will appreciate that the techniques utilized herein may be utilized with any DOM accessible element that can render an image and/or take image drawing instructions. Additionally, while the above examples processed the source document to create the transformed document by removing the text to be protected, for accessibility or other reasons, the processing operations could keep the text to be protected in the document. For example, the text may be moved or added to an "alt" tag or element. This is described in greater detail in the "ACCESSIBILITY" section below.

Figure 8:
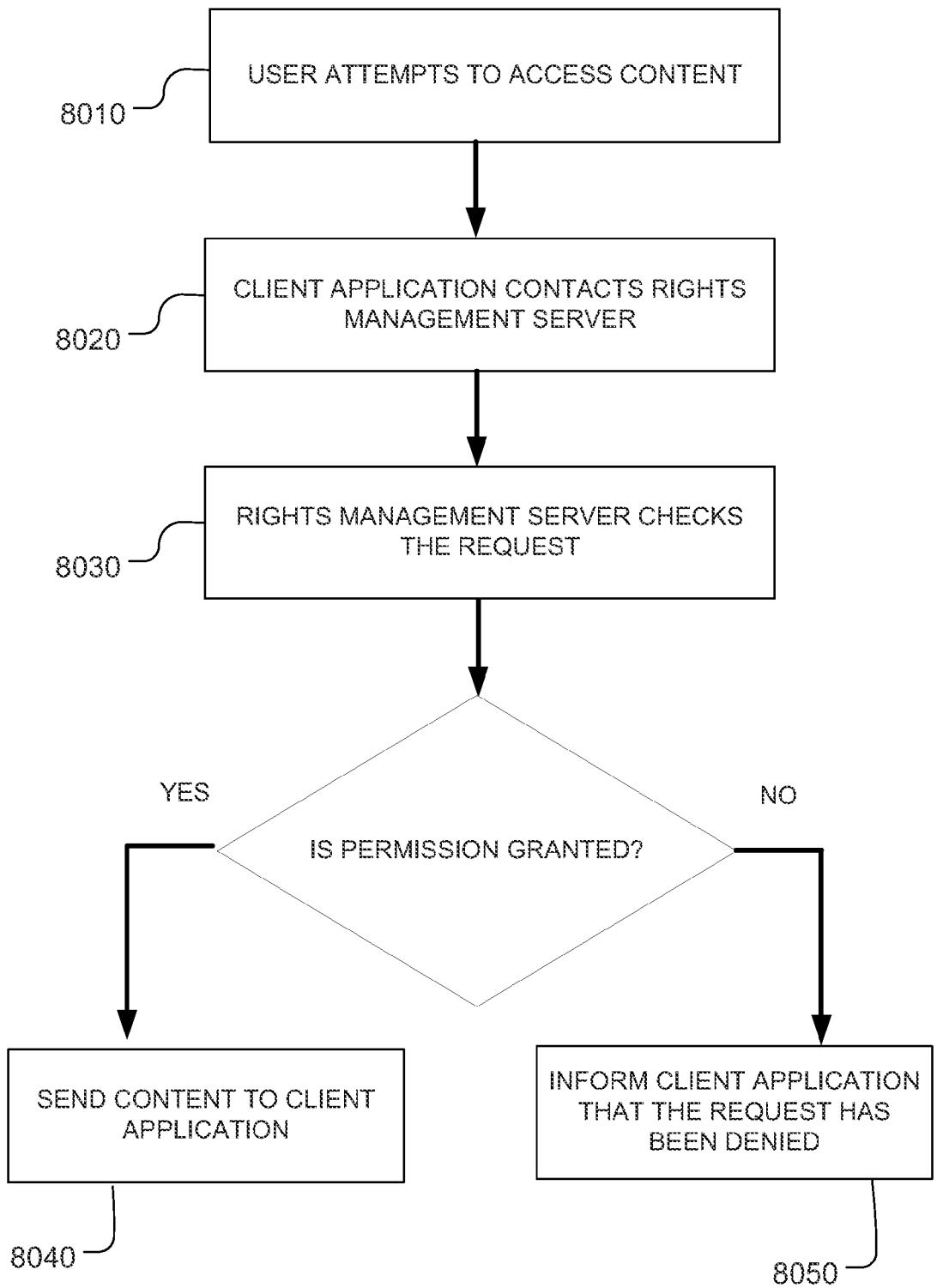
FIG. 8 is an example flowchart of a method of accessing protected content, according to some embodiments of the present disclosure.

FIG. 8 shows one example of a user obtaining permissions for, and being able to access, the protected content. At 8010, the user performs some action that indicates a desire to copy or make use of the desired content in some way. For example, the user may select protected content or attempt to print, copy, or otherwise make unauthorized use of, one or more sections of the content. In some examples, this is detected by a permissions module or script running on the client application. In some examples, the permissions module or script may be implemented using JavaScript. The permissions module or script may then present the user with a list of functions such as copy, paste, print or the like. Once the user selects a function, the permissions module or script may contact an authorization service at operation 8020 to check to see if the user is authorized to copy this content. In other examples, the permissions module or script may first check with the authorization service to determine the functions that will be allowed in order to present the user with only allowed functions. The server may check the request at operation 8030. In some examples, content publishers may submit rules that delineate permissible and impermissible access to the content and may be based upon various factors.

The various rules may consider one or more factors alone or in combination. For example, the rules may consider the action requested. Thus copying and pasting may be allowed, but printing may not. The rules may consider the amount of content access requested by the client application. For example, copying more text than a specific threshold amount at once may not be allowed. The rules may also consider a quota wherein a user may copy, print, or otherwise make use of the content in restricted ways up to a certain maximum amount. Access will be denied if a usage will place the user above their quota. Quotas may be tracked per a specific time period (hourly, daily, weekly, monthly, or the like), per a specific user or client application, and/or per a specific electronic content work. The rules may also consider particular sections or portions of the electronic content work and apply different rules to different sections. For example, certain sections may not be accessible to users. The various rules may be combined. Thus for example, certain sections may have a first quota value and certain other sections may have a second quota value that is different from the first.

In examples in which a quota or other system of keeping track of past accesses is utilized, the amount of content accessed in a particular time period for a particular work may be stored at the client application using a cookie or HTML5 local storage or at the authorization service. For quota examples, the stored amount of content accessed may then be compared to the quota to determine whether the user has exceeded the quota, or will exceed the quota with this access. If the user has or will exceed the quota with this access, the access may be denied. Otherwise, the access may be approved. The comparison may happen at either the client application or at the authorization service. If the quota is per a unit of time, after the unit of time elapses, the amount of content accessed may be reset to zero. The quota may measure any desired unit of textual content include letters, words, sentences, paragraphs, pages, or the like.

In other examples, the user may pay additional sums to access certain content or to increase their quota. For example, the content user may be prompted to authorize a charge to an account in order to unlock access to that particular content or functionality. In other examples, the content user may purchase credits that may be utilized to access certain uses of certain portions of the protected content.

If the permission was granted, the unprotected content may be sent to the client application at operation 8040. If permission was not granted, then the client may be informed that the request was denied at operation 8050. The protected content may have one or more indicators of source (such as a link, citation, or watermark)) attached. In other examples, if the amount of text copied, or the user's usage is below a certain threshold (e.g. a quota), the indicator of source may not be added.

In some examples, to associate the selected graphical representations with the corresponding plain text, each graphical representation and each corresponding textual portion may be associated via an identification number. This number may be stored in the transformed document as metadata or the like. When the permissions module detects that a user has selected one or more of the graphical representations, the permissions module may read the identification numbers of the selected graphical representations and send them to the authorization service. The authorization service may store an index (in some examples created when the source document is processed into the transformed document) that lists the corresponding textual portions according to the identification number. The authorization service may then send back the requested text corresponding to the identification numbers to the client application which may then insert the text into the clipboard for use by the user.

Figure 9:
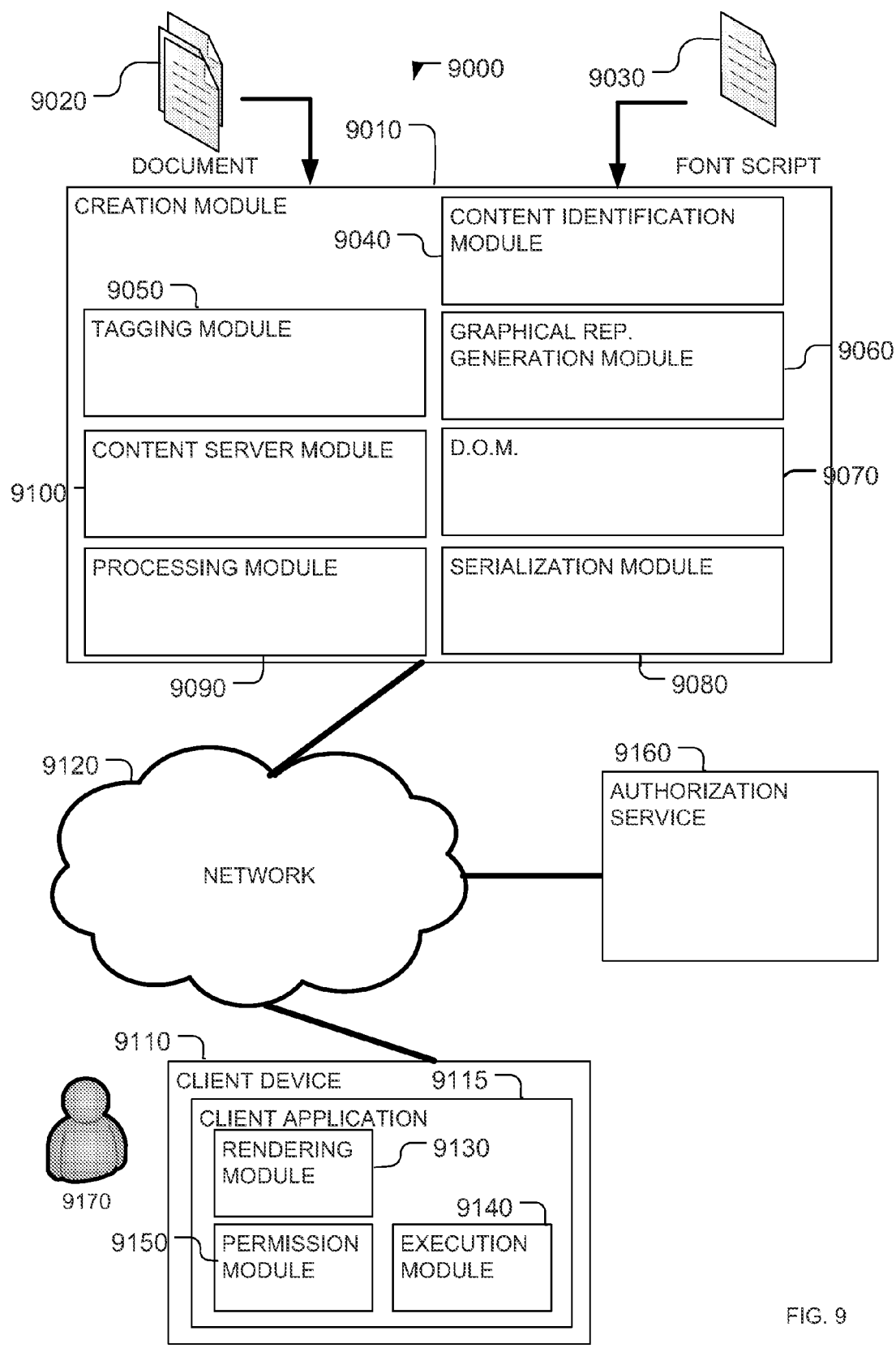
FIG. 9 is an example schematic of a content protection system, according to some embodiments of the present disclosure.

FIG. 9 shows an example system 9000 of the present disclosure. Creation module 9010 takes the source document 9020, identifies the content to be protected, creates the one or more graphical representations and location information, and processes the protected content in the source document to create the transformed document. Creation module 9010 may take source document 9020 and font module or script 9030 as input. Content identification module 9040 may identify one or more portions of content that may be protected in source document 9020. Content creators/administrators may wish to protect only certain portions of the content in document 9020. In some examples, certain words, phrases, sentences, or sections may be protected, while others are not. The content identification module 9040 may identify and mark the sections which are to be protected and those sections which are not to be protected. The content may be identified based on a template, external input, text type or content tags (e.g., certain textual elements, such as body content or headers) or other means.

Tagging module 9050 may then be used to mark the content to be protected from the content that is not to be protected. In some examples, it may do this with markup tags. Within each section of text to be protected, the tagging module may tag the whole section with one set of tags, or may tag subsections of the text with individual tags. For example, each letter or word may get a separate tag, or each sentence may get a separate tag, each paragraph may get a separate tag, or the like. In some examples, tagging may not be necessary because the content to be protected may already be sufficiently identified in the document using markup tags. For example, the system may know that all content is to be protected, or all content within certain already existing tag types is to be protected.

Graphical representation generation module or script 9060 may use font module or script 9030 to generate one or more graphical descriptions of the content identified by the content identification module 9040. In some examples, one description is generated for all the content, but in other examples, one description is generated for a subset of all the content. For example, descriptions may be generated for every letter, word, phrase, sentence, paragraph, page, and the like. The descriptions may either be direct descriptions (e.g., a bitmap, jpeg, gif, png, vector graphics data, or the like) or instructions such as a list of commands (e.g., commands to draw lines, arcs, shapes, and the like). In some examples, the graphical representation generation module or script may insert image, canvas, or other tags into the source document in place of the textual content. The created graphical representations may then be saved along with the location information.

In some examples, the graphical representation generation module 9060, the content identification module 9040, the tagging module 9050, the serialization module 9080, and the processing module 9090 may be loaded by a rendering engine as a result of loading document 9020. For example, these modules may be JavaScript modules that are loaded by the rendering engine because of a command to load them included in the document. In these examples, the graphical representation generation module or script 9060 may insert canvas or other tags and utilize the DOM 9070 to instruct the renderer to properly render the graphical representations. Serialization module or script 9080 may then extract the bitmaps created by the renderer from the DOM.

Processing module 9090 processes the original plain text content from the document. In some examples, the processing module removes the original plain text from the source document. This prevents users from accessing the original content without requesting permission. In other examples, the processing module 9090 may move the original plain text inside one or more alt attributes of the canvas, image, or other tags. In yet other examples, the processing module 9090 may use other non-standard or hidden tags which may cause the client application to not render the original plain text by default. In some examples, the processed textual content may be indexed and stored at creation 9010 or authorization service 9160 for later use by the content user if authorized. Content server module 9100 may send the transformed document, graphical representations, location information, and, in some examples, execution module or script 9140 and permissions module or script 9150 to client device 9110 over network 9120. Network 9120 may be any means of facilitating communication between creation module 9010, client device 9110, and, in some examples, authorization service 9160. Example networks include the Internet, Wide Area Network (WAN), Local Area Network (LAN), cellular, WI-FI, or the like. Client device 9110 is any client device capable of rendering the transformed document and the graphical representations. Examples include a personal computer, a web terminal, a tablet computer, a cellular telephone (including smartphones), and the like. Client application 9110 may include client application 9115 which may include rendering module 9130, permission module 9150 and execution module 9140. Rendering module 9130 may render the transformed document according to the instructions therein and, in some examples, according to the instructions in the execution module or script 9140. Rendering module 9130 may be any application that may render markup language content and execute execution module or script 9140 and, in some examples, permission module or script 9150. Example rendering modules 9130 include Internet browsers include INTERNET EXPLORER® from MICROSOFT®, Inc. of Redmond, Wash., CHROME® from GOOGLE®, Inc. of Mountain View, Calif. SAFARI® developed by Apple Inc., of Cupertino Calif., WEBKIT® based browsers, and the like. In some examples, content server module 9100 may also send permission module or script 9150 and/or execution module or script 9140 over network 9120.

In some examples, content user 9170 utilizes client application 9115 to request the transformed document, graphical representations, location information, and, in some examples, the permission module or script 9150 and/or the execution module or script 9140 from content server module 9100 over network 9120. Content server module 9100 may be any means of providing the transformed document, graphical representations, location information and/or the permission module or script 9150 and/or execution module or script 9140 to content user 9170 through network 9120. In some examples, content server module 9100 is a web server or contains web server capabilities. In some examples, the transformed document contains, or links to, execution module or script 9140 and/or permissions module or script 9150 and may include instructions instructing the rendering module 9130 to execute the execution module or script 9140 and/or permissions module or script 9150. Execution module or script 9140, in some examples, causes the rendering module 9130 to render the graphical representations at the proper locations within the transformed document using the location information. In other examples, the transformed document itself may contain the proper instructions (e.g., image tags) to cause the rendering module 9130 to properly render the content images in the proper locations.

Permissions module or script 9150 may, in some examples, circumvent the client device's cut, copy, paste, print or other functionality to prevent unauthorized content use. In some examples, the permissions module or script 9150 may detect a user trying to access the content in unauthorized ways and attempt to gain permission to allow the content user such access. Permissions module or script 9150 may contact authorization service 9160 through network 9120 to request the unprotected content to allow access. Authorization service 9160 may include logic to determine if permission should be granted to the user to copy, or otherwise utilize the content. If the user receives permission, the unprotected content may be sent to the rendering module 9130 for use by the content user 9170. In some examples, the unprotected content which is stripped from the source document may be indexed and stored at the creation module 9010, authorization service 9160, or some other network service accessible by client device 9110 over network 9120.

While certain functions of the creation module 9010 are described and/or shown as performed by separate modules, it will be appreciated by one skilled in the art with the benefit of Applicants' disclosure that any of the functions may be performed by any other module of the creation module 9010, or by any combination of those modules. The structure shown is intended to be exemplary and not limiting.

While certain functions of the client device 9110 are described and/or shown as performed by separate modules, it will be appreciated by one skilled in the art with the benefit of Applicants' disclosure that any of the functions may be performed by any other module in the client device 9110, or combination of those modules. The structure shown is intended as exemplary and not limiting.

ACCESSIBILITY EXAMPLES

In some previously described examples, the actual textual content was stripped from the document to create the transformed document before sending it to the client application. In some other examples, the textual content may remain in the transformed document but moved to an "alt" attribute included in the image or canvas tags where the graphical representations of the textual content will be placed. The alt attribute is used in markup documents to specify alternative text that may be used by visually impaired content users using a screen reader. Example screen readers include JAWS® developed by the Blind and Low Vision Group of Freedom Scientific of St. Petersburg, Fla. and ORCA® an open source reader developed partially by Sun Microsystems (now Oracle) based in Santa Clara, Calif. These screen readers translate the textual content of a markup page into audio representations of the textual content. The screen readers will read the text in the alt attribute as a substitute for images encountered in the markup. By including the textual content in the alt attribute in the markup, the screen readers will read the textual content. While the content is sent to the client application and visible by the view source command, the user would have to extract each textual portion from the alt attribute of an image or canvas tag which may be cumbersome if the size of each partition (e.g. how much textual content is represented by each graphical representation) is sufficiently small (e.g. every word, sentence, etc. . . . ). This may inhibit attempts at copying while providing visually impaired content users with a way to interact with the content.

Example Client Device

Figure 10:
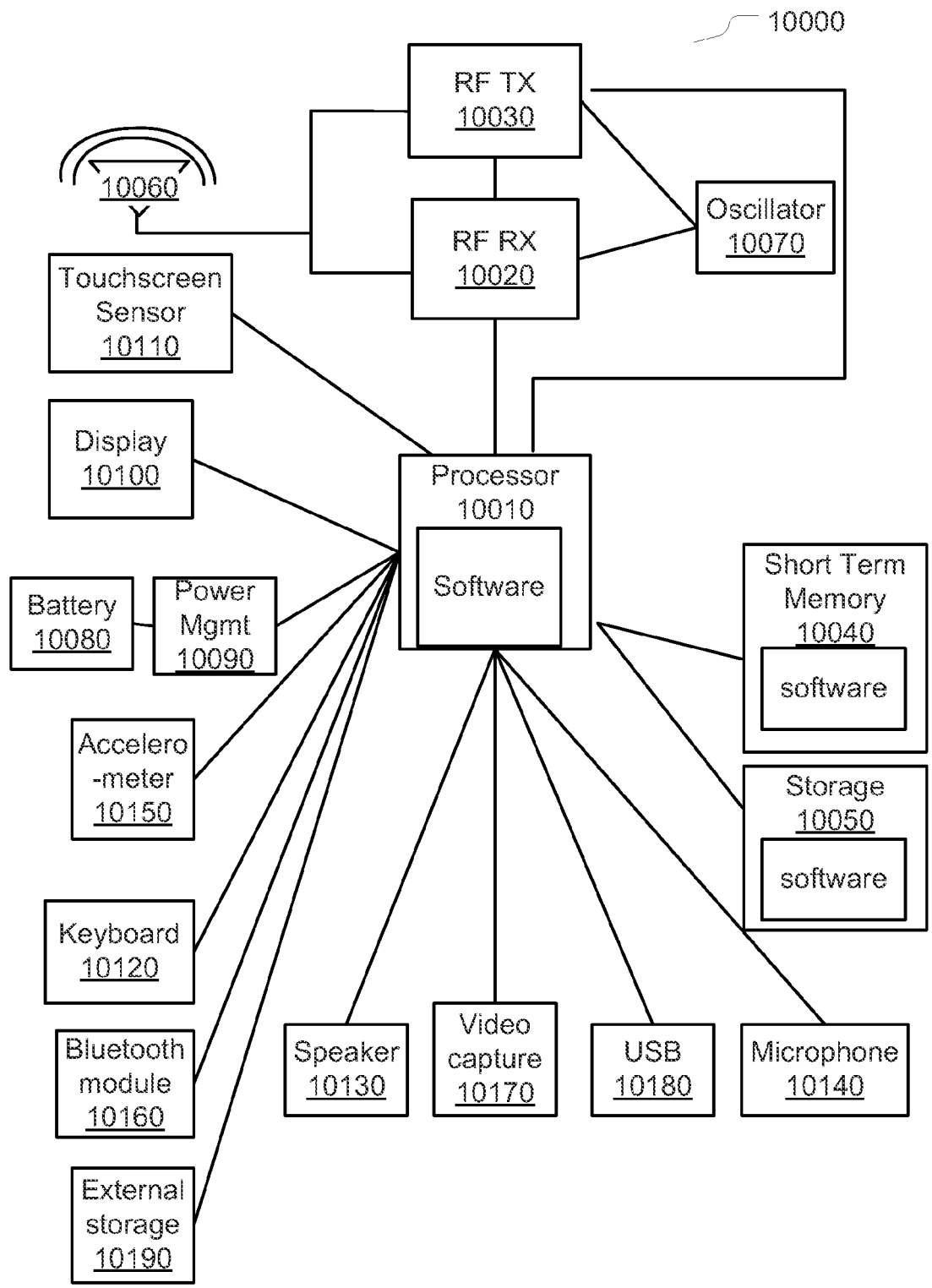
FIG. 10 is an example schematic of a user device, according to some embodiments of the present disclosure.

Examples of client devices which may execute the client applications include desktop computers, laptop computers, server computers, cellphones, smart phones, tablet computers, computer game consoles, portable computer gaming consoles, media players, portable media players, other mobile devices, and the like. FIG. 10 shows one example of such a device 10000 in the form of an electronic device. Processor 10010 controls the overall functions of the electronic device (such as running applications and controlling peripherals). Processor 10010 may be any type of processor including Reduced Instruction Set Computing (RISC), Complex Instruction Set Computing (CISC), Very Long Instruction Word (VLIW), Minimal Instruction Set Computer (MISC), One Instruction Set Computer (OISC), and the like. Processor 10010 may include or function as a Digital Signal Processor ("DSP"). Processor 10010 may communicate with Radio Frequency (RF) receiver 10020 and RF transmitter 10030 to transmit and receive wireless signals such as cellular, Bluetooth, and WI-FI signals. Processor 10010 may use short term memory 10040 to store operating instructions and as storage to help in the execution of the operating instructions (such as the temporary storage of calculations and the like). Processor 10010 may also use non-transitory storage 10050 to read instructions, files, and other data that requires long term, non-volatile storage.

RF Receiver 10020 and RF Transmitter 10030 may send signals to the antenna 10060. RF transmitter 10030 may contains all the necessary functionality for transmitting RF signals via antenna 10060 given a baseband signal sent from Processor 10010. RF transmitter 10030 may contain an amplifier to amplify signals before supplying the signal to antenna 10060. RF transmitter 10030 and RF Receiver 10020 are capable of transmitting and receiving RF signals of any frequency including microwave frequency bands (0.3 to 70 GHz), which include cellular telecommunications, Wireless LAN (WLAN) and Wireless WAN (WWAN) frequencies. Oscillator 10070 may provide a frequency pulse to both RF Receiver 10020 and RF Transmitter 10030.

Device 10000 may include a battery or other power source 10080 with associated power management process or module 10090. Power management module 10090 distributes power from the battery 10080 to the other various components. Power management module 10090 may also convert the power from battery 10080 to match the needs of the various components. Power may also be derived from alternating or direct current supplied from a power network.

Processor 10010 may communicate and control other peripherals, such as LCD display 10100 with associated touch screen sensor 10110. Processor 10010 causes images to be displayed on LCD display 10100 and receives input from the touch screen sensor 10110 when a user presses on the touch screen display. In some examples, touch screen sensor 10110 may be a multi-touch sensor capable of distinguishing and processing gestures. In some examples, the LCD display 10100, processor 10010, and touch screen sensor 10110 may implement a touch screen keyboard for receiving alphanumeric input from a user. The processor 10010 may draw an image of a keyboard on the LCD display 10100 and process inputs from the touch screen sensor 10110. The processor 10010 may associate the input with a particular displayed key in order to determine a particular input character.

Processor 10010 may also receive input from a physical keyboard 10120. Processor 10010 may produce audio output and other alerts which are played on the speaker 10130. Speaker 10130 may also be used to play voices (in the case of a voice phone call) that have been received from RF receiver 10020 and been decoded by Processor 10010. Microphone 10140 may be used to transmit a voice for a voice call conversation to Processor 10010 for subsequent encoding and transmission using RF Transmitter 10030. Microphone 10140 may also be used as an input device for commands using voice processing software. Accelerometer 10150 provides input on the motion of the device 10000 to processor 10010. Accelerometer 10150 may be used in motion sensitive applications. Bluetooth module 10160 may be used to communicate with Bluetooth-enabled external devices. Video capture device 10170 may be a still or moving picture image capture device or both. Video Capture device 10170 is controlled by Processor 10010 and may take and store photos, videos, and may be used in conjunction with microphone 10140 to capture audio along with video. Universal Serial Bus (USB) port 10180 enables external connections to other devices supporting the USB standard and charging capabilities. USB port 10180 may include all the functionality to connect to, and establish a connection with, an external device over USB. External storage module 10190 may include any form of removable physical storage media such as a flash drive, micro SD card, SD card, Memory Stick and the like. External storage module 10190 may include all the functionality needed to interface with these media.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 11:
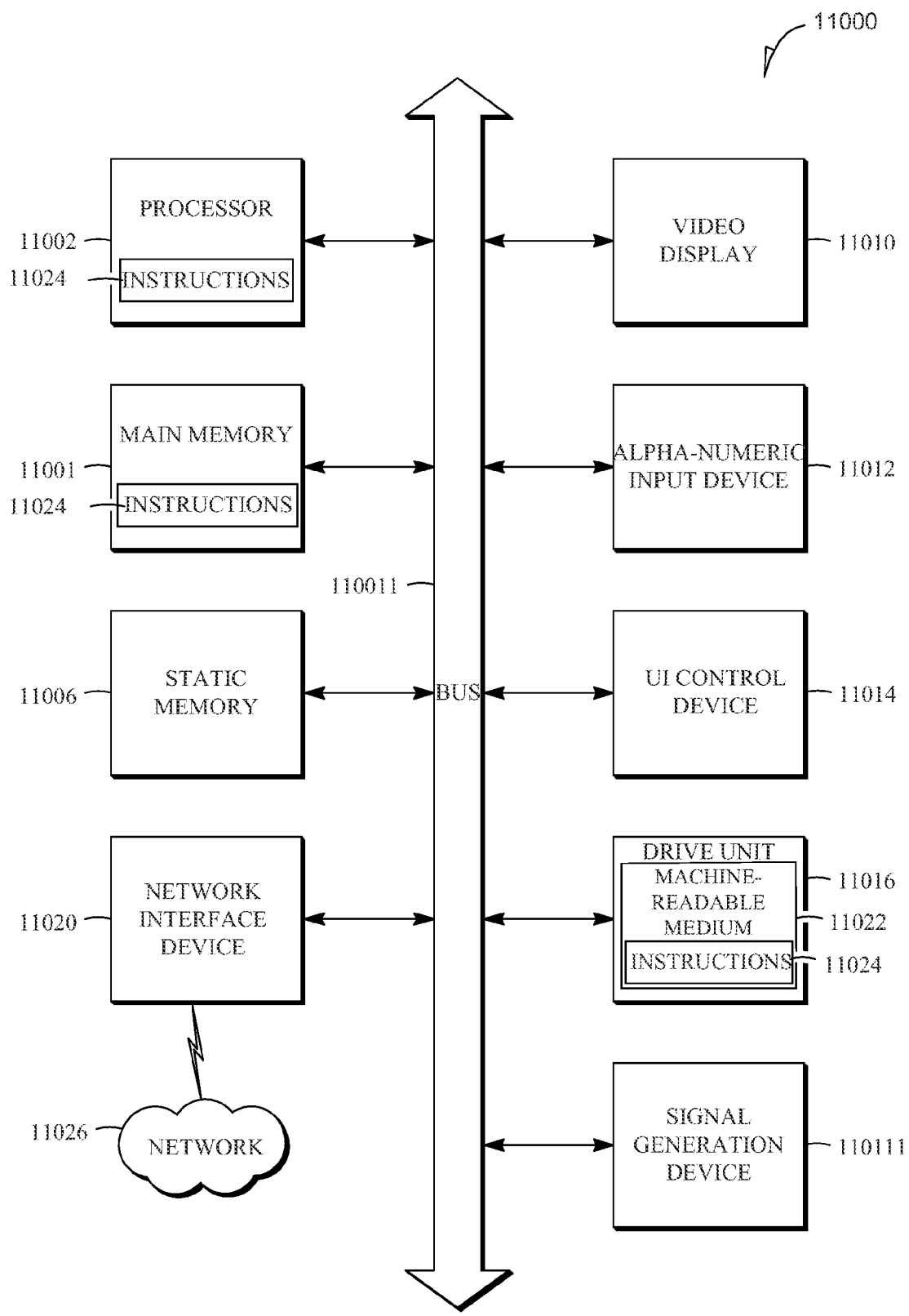
FIG. 11 is an example schematic of a machine, according to some embodiments of the present disclosure.

FIG. 11 shows a diagrammatic representation of a machine in the example form of a computer system 11000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems that that are linked (e.g., either by hardwired, wireless, or a combination of hardwired and wireless connections) through a network both perform tasks. In a distributed system environment, program modules may be located in both local and remote memory-storage devices (see below).

The example computer system 11000 includes a processor 11002 (e.g., a Central Processing Unit (CPU), a Graphics Processing Unit (GPU) or both), a main memory 11001 and a static memory 11006, which communicate with each other via a bus 11011. The computer system 11000 may further include a video display unit 11010 (e.g., a LCD or a Cathode Ray Tube (CRT)). The computer system 11000 also includes an alphanumeric input device 11012 (e.g., a keyboard), a User Interface (UI) controller 11014 (e.g., a mouse, touchscreen, or the like), a disk drive unit 11016, a signal generation device 110111 (e.g., a speaker) and a network interface device 11020 (e.g., a transmitter).

The disk drive unit 11016 includes a machine-readable medium 11022 on which is stored one or more sets of instructions 11024 and data structures (e.g., software) embodying or used by any one or more of the methodologies or functions illustrated herein. The software may also reside, completely or at least partially, within the main memory 11001 and/or within the processor 11002 during execution thereof by the computer system 11000, the main memory 11001 and the processor 11002 also constituting machine-readable media.

The instructions 11024 may further be transmitted or received over a network 11026 via the network interface device 11020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

ADDITIONAL NOTES AND EXAMPLES

Example 1

A content protection method comprising: partitioning textual content in a source document markup file into a plurality of subsets; generating one or more graphical representations for each of at least two of the plurality of subsets; processing the at least two of the plurality of subsets from the source document to create a transformed document, the processing such that, when the transformed document is rendered by a client application, the at least two of the plurality of subsets are not rendered as part of the transformed document; generating location information for each graphical representation, the location information identifying a position in the transformed document of each processed subset to which each graphical representation corresponds; and transmitting the transformed document, graphical representations, and location information to the client application over a network.

Example 2

The method of example 1, wherein the graphical representations include a series of one or more drawing instructions, and the location information includes one or more canvas tags inserted into the transformed document where the at least two of the plurality of subsets were processed in the source document and the location information also includes correlation information which associates each graphical representation with a particular canvas tag; and the method comprises: transmitting an execution module to the client application which contains instructions to place the graphical representations into the one or more canvas tags using the correlation information.

Example 3

The method of example 1, wherein the graphical representations include image data, and the location information includes one or more canvas tags inserted into the transformed document where the at least two of the plurality of subsets were processed in the source document and the location information also includes correlation information which associates each graphical representation with a particular canvas tag; and the method comprises: transmitting an execution module to the client application which contains instructions to place the graphical representations into the one or more canvas tags using the correlation information.

Example 4

The method of example 1, wherein the graphical representations include image data, and the location information includes one or more image tags inserted into the transformed document where the at least two of the plurality of subsets were processed in the source document, the image tags linking to the corresponding graphical representations.

Example 5

The method of example 1, wherein the graphical representations include image data, and the location information includes one or more image tags inserted into the transformed document where the at least two of the plurality of subsets were processed in the source document, the image tags including the corresponding graphical representations inline.

Example 6

The method of example 1, wherein the graphical representations include vector graphics data and the location information includes one or more canvas tags inserted into the transformed document where the at least two of the plurality of subsets were processed in the source document and the location information also includes correlation information which associates each graphical representation with a particular canvas tag; and the method comprises transmitting an execution module to the client application which contains instructions to place the graphical representations into the one or more canvas tags using the correlation information.

Example 7

The method of example 1, wherein generating a graphical representation comprises: for each subset of text, partitioning the subset into the constituent characters of the subset and for each character, looking up the graphical representation corresponding to that character in a font module.

Example 8

The method of example 1, wherein the partitioning of the textual content, the generating of the graphical representations, and the processing of the one or more subsets of text are performed by a renderer in association with rendering the source document.

Example 9

The method of example 1, wherein the processing includes removing the at least two of the plurality of subsets from the source document.

Example 10

The method of claim 1, wherein the processing includes moving the at least two of the plurality of subsets of textual content to an alt property of one or more DOM elements capable of displaying an image.

Example 11

A content protection system comprising: a content identification module configured to partition textual content in a source document markup file into a plurality of subsets; a processing module configured to: process at least two of the plurality of subsets from the source document to create a transformed document, the processing such that, when the transformed document is rendered by a client application, the at least two of the plurality of subsets are not rendered as part of the transformed document; a graphical representation generation module configured to: generate one or more graphical representations for each of the at least two of the plurality of subsets; and generate location information for each graphical representation, the location information identifying a position in a transformed document of each processed subset to which each graphical representation corresponds; and an output module configured to transmit the transformed document, graphical representations, and location information to the client application over a network.

Example 12

The system of example 11, wherein the graphical representations include a series of one or more drawing instructions, and the location information includes one or more canvas tags inserted into the transformed document where the at least two of the plurality of subsets were processed in the source document and the location information also includes correlation information which associates each graphical representation with a particular canvas tag; and the output module is configured to transmit an execution module to the client application which contains instructions to place the graphical representations into the one or more canvas tags using the correlation information.

Example 13

The system of example 11, wherein the graphical representations include image data, and the location information includes one or more canvas tags inserted into the transformed document where the at least two of the plurality of subsets were processed in the source document and the location information also includes correlation information which associates each graphical representation with a particular canvas tag; and the output module is configured to transmit an execution module to the client application which contains instructions to place the graphical representations into the one or more canvas tags using the correlation information.

Example 14

The system of example 11, wherein the graphical representations include image data, and the location information includes one or more image tags inserted into the transformed document where the at least two of the plurality of subsets were processed in the source document, the image tags linking to the corresponding graphical representations.

Example 15

The system of example 11, wherein the graphical representations include image data, and the location information includes one or more image tags inserted into the transformed document where the at least two of the plurality of subsets were processed in the source document, the image tags including the corresponding graphical representations inline.

Example 16

The system of example 11, wherein the graphical representations include vector graphics data and the location information includes one or more canvas tags inserted into the transformed document where the at least two of the plurality of subsets were processed in the source document and correlation information which associates each graphical representation with a particular canvas tag: and the output module is configured to transmit an execution module to the client application which contains instructions to place the graphical representations into the one or more canvas tags using the correlation information.

Example 17

The system of example 11, wherein the graphical representation generation module is configured to: for each subset of text, partitioning the subset into the constituent characters of the subset and for each character, looking up the graphical representation corresponding to that character in a font module.

Example 18

The system of example 11, wherein the content identification module, processing module and graphical representation generation module are scripts executed by a renderer in association with rendering the source document.

Example 19

The system of example 11, wherein the processing module is configured to process at least two of the plurality of subsets from the source document to create a transformed document by removing the at least two of the plurality of subsets from the source document.

Example 20

The system of example 11, wherein the processing module is configured to process at least two of the plurality of subsets from the source document to create a transformed document by moving the at least two of the plurality of subsets of textual content to an alt attribute of one or more DOM elements capable of displaying an image.

Example 21

A machine readable medium that stores instructions which when performed by a machine, cause the machine to perform operations comprising: partitioning textual content in a source document markup file into a plurality of subsets; generating one or more graphical representations for each of at least two of the plurality of subsets; processing the at least two of the plurality of subsets from the source document to create a transformed document, the processing such that, when the transformed document is rendered by a client application, the at least two of the plurality of subsets are not rendered as part of the transformed document; generating location information for each graphical representation, the location information identifying a position in the transformed document of each processed subset to which each graphical representation corresponds; and transmitting the transformed document, graphical representations, and location information to the client application over a network.

Example 22

The machine-readable medium of example 21, wherein the graphical representations include a series of one or more drawing instructions, and the location information includes one or more canvas tags inserted into the transformed document where the at least two of the plurality of subsets were processed in the source document and the location information also includes correlation information which associates each graphical representation with a particular canvas tag;

and the instructions comprise instructions which when performed by the machine, cause the machine to perform the operations comprising: transmitting an execution module to the client application which contains instructions to place the graphical representations into the one or more canvas tags using the correlation information.

Example 23

The machine-readable medium of example 21, wherein the graphical representations include image data, and the location information includes one or more canvas tags inserted into the transformed document where the at least two of the plurality of subsets were processed in the source document and the location information also includes correlation information which associates each graphical representation with a particular canvas tag; and the instructions comprise instructions which when performed by the machine, cause the machine to perform the operations comprising: transmitting an execution module to the client application which contains instructions to place the graphical representations into the one or more canvas tags using the correlation information.

Example 24

The machine-readable medium of example 21, wherein the graphical representations include image data, and the location information includes one or more image tags inserted into the transformed document where the at least two of the plurality of subsets were processed in the source document, the image tags linking to the corresponding graphical representations.

Example 25

The machine-readable medium of example 21, wherein the graphical representations include image data, and the location information includes one or more image tags inserted into the transformed document where the at least two of the plurality of subsets were processed in the source document, the image tags including the corresponding graphical representations inline.

Example 26

The machine-readable medium of example 21, wherein the graphical representations include vector graphics data and the location information includes one or more canvas tags inserted into the transformed document where the at least two of the plurality of subsets were processed in the source document and the location information also includes correlation information which associates each graphical representation with a particular canvas tag: and the instructions comprise instructions which when performed by the machine, cause the machine to perform the operations comprising: transmitting an execution module to the client application which contains instructions to place the graphical representations into the one or more canvas tags using the correlation information.

Example 27

The machine-readable medium of example 21, wherein the instructions for generating a graphical representation comprise instructions which when performed by the machine cause the machine to perform the operations comprising: for each subset of text, partitioning the subset into the constituent characters of the subset and for each character, looking up the graphical representation corresponding to that character in a font module.

Example 28

The machine-readable medium of example 21, wherein the instructions for processing comprise instructions which when performed by the machine cause the machine to perform the operations comprising: removing the at least two of the plurality of subsets from the source document.

Example 29

The machine-readable medium of example 21, wherein the instructions for processing comprise instructions which when performed by the machine cause the machine to perform the operations comprising: moving the at least two of the plurality of subsets of textual content to an alt property of one or more DOM elements capable of displaying an image.

Example 30

A method of rendering protected content, the method comprising: receiving at a client device a transformed document, location information, and a plurality of graphical representations over a network, wherein the transformed document was created by processing at least two of a plurality of textual subsets of textual content in a source document markup file, the processing such that the at least two textual subsets are not rendered by the client device, and wherein the plurality of graphical representations correspond to the at least two of the plurality of textual subsets; rendering the transformed document on a display; rendering the plurality of graphical representations as part of the transformed document using the location information to properly position the graphical representations in the transformed document; and wherein the graphical representations, when rendered in the proper location in the transformed document appear to the user to be the at least two of the plurality of textual subsets.

Example 31

The method of example 30, comprising: executing a permissions module received over the network, the permissions module disabling the cut and copy functionality of the client device.

Example 32

The method of example 31, comprising: detecting a selection by a user of one or more of the plurality of graphical representations using the permissions module; contacting a permissions server over the network and requesting plain text corresponding to the plurality of graphical representations; receiving the plain text corresponding to the plurality of graphical representations; and inserting the plain text in a clipboard of the client device.

Example 33

The method of example 32, wherein the permissions module is contacted only if a usage amount is below a threshold amount.

Example 34

The method of example 30, wherein the location information includes a plurality of canvas markup tags in the transformed document and correlation information which associates each graphical representation with a particular canvas tag and rendering the plurality of graphical representations as part of the transformed document using the location information comprises: creating a plurality of canvases for each canvas tag: inserting the proper graphical representation into each canvas based on the correlation information.

Example 35

The method of example 30, wherein the location information includes image tags in the transformed document.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document: for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A content protection method comprising:
partitioning textual content in a source document markup file into a plurality of subsets of text;
generating one or more graphical representations for each of at least two of the plurality of subsets of text, wherein a graphical representation comprises one or more files with instructions for rendering a corresponding subset of text;
processing the at least two of the plurality of subsets from the source document to create a transformed document, wherein the processing includes moving the at least two of the plurality of subsets of text to an alt attribute of one or more DOM elements for displaying an image such that, when the transformed document is rendered by a client application, the at least two of the plurality of subsets of text are not rendered as part of the transformed document;
generating location information for each graphical representation, the location information identifying a position in the transformed document of each processed subset to which each graphical representation corresponds; and
transmitting the transformed document, graphical representations, and location information to the client application over a network.

2. The method of claim 1, wherein the graphical representations includes a series of one or more drawing instructions, and the location information includes one or more canvas tags inserted into the transformed document where the at least two of the plurality of subsets of text were processed in the source document and the location information also includes correlation information which associates each graphical representation with a particular canvas tag; and the method comprises:
transmitting an execution module to the client application which contains instructions to place the graphical representations into the one or more canvas tags using the correlation information.

3. The method of claim 1, wherein the graphical representations includes image data, and the location information includes one or more canvas tags inserted into the transformed document where the at least two of the plurality of subsets of text were processed in the source document and the location information also includes correlation information which associates each graphical representation with a particular canvas tag; and the method comprises:
transmitting an execution module to the client application which contains instructions to place the graphical representations into the one or more canvas tags using the correlation information.

4. The method of claim 1, wherein the graphical representations includes image data, and the location information includes one or more image tags inserted into the transformed document where the at least two of the plurality of subsets of text were processed in the source document, the image tags linking to the corresponding graphical representations.

5. The method of claim 1, wherein the graphical representations includes image data, and the location information includes one or more image tags inserted into the transformed document where the at least two of the plurality of subsets of text were processed in the source document, the image tags including the corresponding graphical representations inline.

6. The method of claim 1, wherein generating a graphical representation comprises:

for each subset of text, partitioning the subset into the constituent characters of the subset and for each character, looking up the graphical representation corresponding to that character in a font module.

7. The method of claim 1, wherein the processing includes removing the at least two of the plurality of subsets of text from the source document.

8. A content protection system comprising:

a processor and a storage device communicatively coupled to the processor, the storage device storing processor-executable instructions, which instructions, when executed by the processor, cause the processor to configure the content protection system as:

a content identification module configured to partition textual content in a source document markup file into a plurality of subsets of text;

a processing module configured to:

process at least two of the plurality of subsets of text from the source document to create a transformed document by moving the at least two of the plurality of subsets of textual content to an alt attribute of one or more DOM elements for displaying an image, the processing such that, when the transformed document is rendered by a client application, the at least two of the plurality of subsets of text are not rendered as part of the transformed document;

a graphical representation generation module configured to:

generate one or more graphical representations for each of the at least two of the plurality of subsets of text, wherein a graphical representation comprises one or more files with instructions for rendering a corresponding subset of text; and generate location information for each graphical representation, the location information identifying a position in a transformed document of each processed subset of text to which each graphical representation corresponds; and an output module configured to transmit the transformed document, graphical representations, and location information to the client application over a network.

9. The system of claim 8, wherein the graphical representations includes a series of one or more drawing instructions, and the location information includes one or more canvas tags inserted into the transformed document where the at least two of the plurality of subsets of text were processed in the source document and the location information also includes correlation information which associates each graphical representation with a particular canvas tag; and the output module is configured to transmit an execution module to the client application which contains instructions to place the graphical representations into the one or more canvas tags using the correlation information.

10. The system of claim 8, wherein the graphical representations includes image data, and the location information includes one or more canvas tags inserted into the transformed document where the at least two of the plurality of subsets of text were processed in the source document and the location information also includes correlation information which associates each graphical representation with a particular canvas tag; and the output module is configured to transmit an execution module to the client application which contains instructions to place the graphical representations into the one or more canvas tags using the correlation information.

11. The system of claim 8, wherein the graphical representations includes image data, and the location information includes one or more image tags inserted into the transformed document where the at least two of the plurality of subsets of text were processed in the source document, the image tags linking to the corresponding graphical representations.

12. The system of claim 8, wherein the graphical representations includes image data, and the location information includes one or more image tags inserted into the transformed document where the at least two of the plurality of subsets of text were processed in the source document, the image tags including the corresponding graphical representations inline.

13. The system of claim 8, wherein the graphical representation generation module is configured to:

for each subset of text, partition the subset into the constituent characters of the subset and for each character, look up the graphical representation corresponding to that character in a font module.

14. The system of claim 8, wherein the processing module is configured to process at least two of the plurality of subsets of text from the source document to create a transformed document by removing the at least two of the plurality of subsets of text from the source document.

15. A method of rendering protected content, the method comprising:

receiving at a client device a transformed document, location information, and a plurality of graphical representations over a network, wherein the transformed document was created by processing at least two of a plurality of textual subsets of textual content in a source document markup file by moving the at least two of the plurality of subsets of text to an alt attribute of one or more DOM elements for displaying an image, the processing such that the at least two textual subsets are not rendered by the client device, and wherein the plurality of graphical representations correspond to the at least two of the plurality of textual subsets, wherein a graphical representation from the plurality comprises one or more files with instructions for rendering a corresponding subset of text;

rendering the transformed document on a display;

rendering the plurality of graphical representations as part of the transformed document using the location information to properly position the graphical representations in the transformed document; and wherein the graphical representations, when rendered in the proper location in the transformed document appear to the user to be the at least two of the plurality of textual subsets.

16. The method of claim 15, comprising:

executing a permissions module received over the network, the permissions module disabling the cut and copy functionality of the client device;

detecting a selection by a user of one or more of the plurality of graphical representations using the permissions module;

contacting a permissions server over the network and requesting plain text corresponding to the plurality of graphical representations;

receiving the plain text corresponding to the plurality of graphical representations; and inserting the plain text in a clipboard of the client device.

17. The method of claim 15, wherein the location information includes a plurality of canvas markup tags in the transformed document and correlation information which associates each graphical representation with a particular canvas tag and rendering the plurality of graphical representations as part of the transformed document using the location information comprises:

creating a plurality of canvases for each canvas tag;
   inserting the proper graphical representation into each canvas based on the correlation information.

18. The method of claim 15, wherein the location information includes image tags in the transformed document.

* * * * *